Patented May 16, 1944

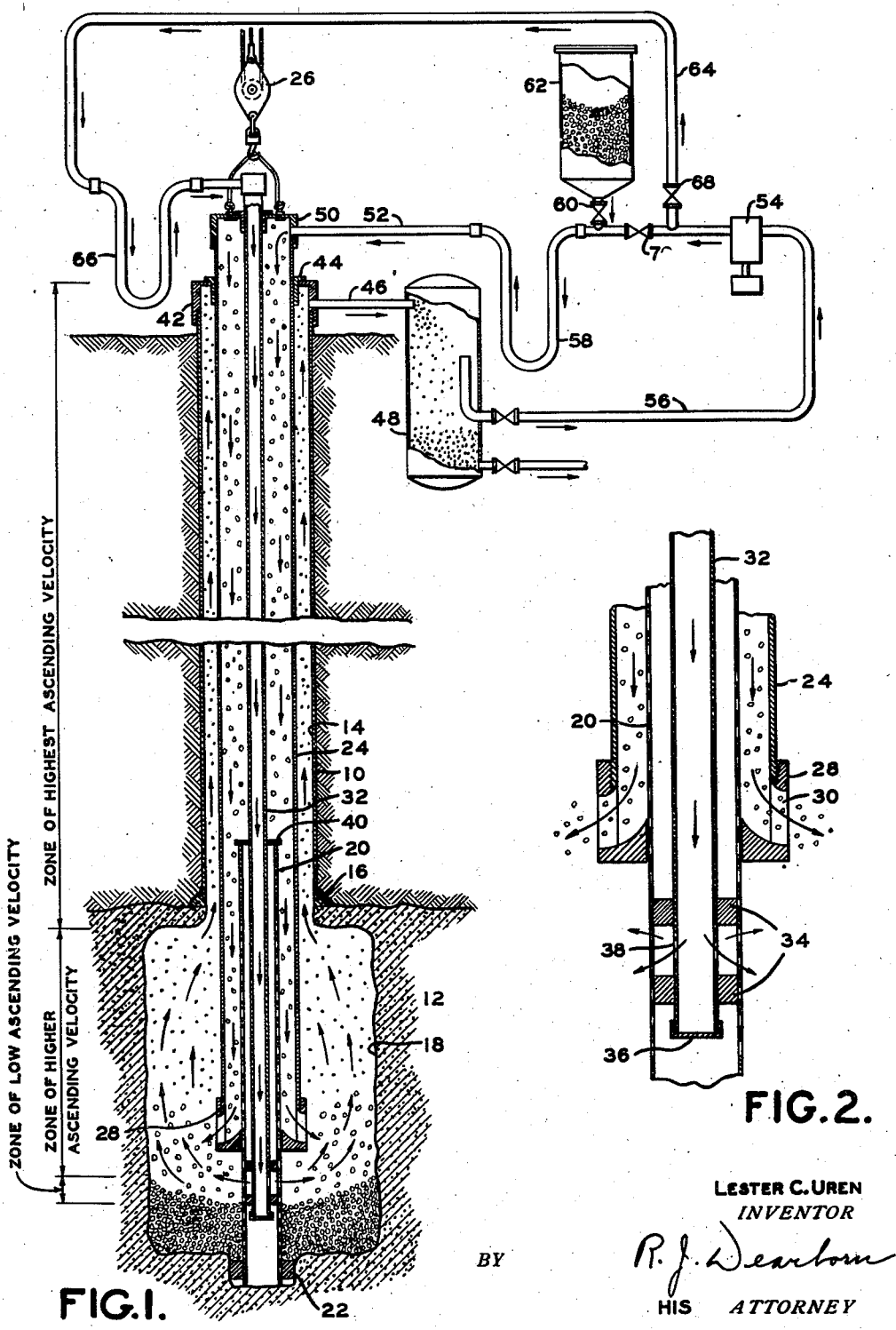

2,349,062

UNITED STATES PATENT OFFICE 2,349,062

METHOD AND APPARATUS FOR GRAVELING WELLS

Lester Charles Uren, Berkeley, Calif., assignor to The Texas Company, New York, N. Y., a corporation of Delaware Application March 27, 1942, Serial No. 436,424

7 Claims. (Cl. 166—1)

This invention relates to the completion of wells and more particularly to a method and an apparatus by means of which a uniform pack of gravel or other granular material can be placed in a well bore around a perforated liner or screen. The principal object of the invention is to provide a method and means for removing foreign or detrital material from the well cavity and from the gravel being deposited during the depositing operation so that the holes or pore spaces in the resulting filter pack will be clear and free of small particles, drilling mud, silt, and the like.

In equipping wells for the production of oil, gas and water from unconsolidated and semi-consolidated formations, it is usual to provide a perforated liner or screen through the producing sand. This is designed to prevent the walls of the well from caving and to restrain influx of sand and detrital material that often display a tendency to flow through the perforations and screens with the oil, gas or water that it is desired to produce. If the perforations and screen openings are made small enough to restrain the finer sand and shale particles, they tend to become clogged with detrital material and production of fluids is unduly restricted. To avoid this, it has become common practice to ream the well to larger-than-normal diameter through the producing interval, forming an annular cavity about the liner, and then to fill this cavity with coarse sand or gravel. Fluids move freely through the interstices between the gravel particles, but loose detrital material bridges the openings through which the fluids move, so that little or no formational sand or shale particles may reach the liner. Furthermore, due to the larger diameter of the well through the producing interval, the fluids enter the well cavity with lower velocity than would be the case in a well of smaller diameter, and have less carrying capacity for detrital material.

Processes for placing gravel outside of screen pipe in well cavities generally involve circulating the gravel into place through a column of tubing, or between two concentric columns of tubing, using clay-laden fluid, water or oil as a circulating medium. The methods employed often result in caving of loose material from the walls of the well cavity, which material tends to become occluded between the gravel particles, thereby reducing permeability of the gravel envelope to passage of fluids. When clay-laden water is used as a placement medium, the clay often tends to gel and accumulate between the gravel particles, thereby restricting subsequent passage of the oil, gas or water that it is desired to produce through the gravel envelope. It is important that the gravel particles be of suitable size, so that when placed in the well cavity, the openings between particles will be of such size as will restrain influx of detrital material from the producing formation. Also, the method of placement of the gravel in the well cavity should be such that the gravel particles will be thoroughly compacted to form an envelope of minimum porosity and maximum density. Imperfect placement of gravel in the well cavity will often result in an envelope of irregular permeability, perhaps leaving open channels through which detrital material from the producing formation may readily pass. Present commonly used methods of circulating gravel into wells sometimes result in formation of gravel envelopes of highly irregular permeability that can be only partially effective in serving their intended purpose.

In accordance with this invention, the novel feature resides in the development of conditions within the well cavity, whereby the gravel particles are caused to settle downward through an ascending stream of fluid that frees them of occluded detrital material and adherent clay, these foreign materials being circulated to the surface in suspension in the ascending fluid. Two streams of fluid are employed, one to carry the gravel down to the well cavity from the surface, the other being simultaneously ejected horizontally outward through the liner perforations into the well cavity, at or immediately above the level of the surface on which the descending particles of gravel are accumulating. This latter stream of fluid is maintained in such volume that its ascending velocity in the well cavity will permit gravel particles to settle, but finer and lighter particles of detrital material will be swept upward toward the surface. The two streams merge at the level of injection of gravel particles into the well cavity and rise together to the surface at a velocity that permits no further settling of suspended solids. The fluids thus exercise a selective sorting action on the suspended solids in the well cavity, depositing those which it is desired to retain and removing foreign contaminants which, if allowed to remain, would reduce the effectiveness of the gravel envelope.

For a better understanding of the invention reference may be had to the accompanying drawing in which:

Figure 1 is a sectional elevation through a well bore and surface equipment, showing gravel being deposited in the well cavity, and Figure 2 is an enlarged sectional elevation of the lower end of the gravel placing tubing.

Referring to the drawing, a well bore 10 is shown as having been drilled through several formations including an oil bearing sand 12. A casing 14 is placed in that portion of the hole above the producing formation and is cemented in place in the usual manner, as at 16. That portion of the hole within the producing formation 12 is preferably underreamed by mechanical or hydraulic means to form the well cavity 18. The first operation in equipping the well for gravel packing by the method and means herein proposed consists in lowering a perforated liner or screen 20 of such construction that it presents a smooth exterior and interior cylindrical surface. The liner 20 may be lowered in any suitable manner, such as on the lower end of a string of tubing, not shown, suitably connected to the upper end of the liner, as by a coupling having a left-hand thread. A packer 22 on the lower end of the liner 20 may be set against the wall of the well just below the cavity 18 to hold the liner firmly at this point so that it will not turn or be lifted out of its position by subsequent manipulation of the circulating equipment. After the packer setting operation, the tubing used for lowering the liner may be turned in a clockwise direction, thus disengaging the left-hand threaded connection so that the liner will be left in the well while the tubing string is withdrawn.

A column of pipe, such as light casing 24, of somewhat larger diameter than the liner 20 is lowered into the well as by means of the pulley and cable 26. The lower end of the column 24 is equipped with a foot-piece 28 closing the annular space between the liner 20 and the column 24 and having one or more substantially lateral openings 30 of such size that granular material suspended in a circulating liquid will pass freely from within the column 24 into the cavity 18. The bottom of the foot-piece 28 is formed with a circular opening of such size that it will fit snugly over the exterior surface of the liner 20 and yet slide freely thereon. The lower part of the casing column 24 and its foot-piece 28 will thus telescope over the liner 20 so that the two tubes will be concentric, leaving an annular space between.

Another column of tubing 32 of such size that it may pass inside of the liner 20 is then lowered from the surface, this column of tubing being equipped near its lower end with two packers 34 separated a short distance and of such size that they fit snugly against the internal surface of the liner 20 and yet slide freely thereon. The bottom of the tubing 32 is closed, as at 36, and is provided with openings 38 between the packers 34 to permit of fluid forced down through the tubing 32 flowing horizontally outward through the annular space between the liner 20 and the tubing 32 and thence through the liner perforations into the well cavity 18. Mounted on the tubing 32 above the uppermost of the two packers 34 is a metal disc 40, centrally bored to slip easily over the smooth exterior surface of the tubing 32 and of a diameter slightly larger than the liner 20. As the lower part of the tubing 32 with the packers 34 passes down inside the liner 20, the disc 40 comes to rest on top of the liner 20, thus closing the annular space between the liner 20 and the tubing 32 and remains there as the tubing 32 is manipulated during subsequent placement of gravel in the well cavity. Eventually, the disc 40 is again withdrawn to the surface with the tubing 32 and the packers 34 thereon.

The annular space between the well casing 14 and the light casing string 24 is closed at the surface by a casing head 42 which is equipped with a gland 44 that permits of vertical movement of the casing string 24. The latter string is of smooth exterior construction near its upper end to permit of this vertical movement through the gland 44. A side outlet 46 connects the annular space between the casings 14 and 24 to a storage tank 48. The annular space between the casing string 24 and the tubing 32 is closed by a head 50 which is attached rigidly to both strings so that they may be raised and lowered together. A side connection 52 through the head 50 permits of forcing gravel suspended in a liquid circulating medium under pump pressure into the annular space between the casing string 24 and the tubing 32, the circulating medium and suspended gravel passing down through this annular space, through the annular space between casing 24 and liner 20, and thence out to the well cavity 18 through the ports 30 in the foot-piece 28. As is shown more clearly in Figure 2, the tubing 32 extends to a somewhat greater depth than the casing string 24 and its foot-piece 28 so that fluid circulating down through tubing 32 and outward through ports 38 and the perforations in the liner 20 will enter the well cavity 18 below the gravel carrying fluid jetted from the ports 30 and the foot-piece 28.

At the surface the storage tank 48 provides storage for the circulating fluid to be employed in graveling the well. A pump 54 draws fluid from the tank 48 through the valved pipe 56 and forces this fluid through a flexible connection 58 and then through the pipe 52 into the annular space within the casing string 24. The fluid then passes through this annular space downwardly and into the well cavity 18 through the ports 30 in the foot-piece 28. Connecting with the pump discharge line through a suitable control valve 60 is a gravel container 62 adapted to feed gravel into the fluid from the pump 54 before the fluid enters the upper end of the string 24. The container 62 may, of course, be maintained under pressure, and, if desired, two of these containers may be used so that one may be discharging while the other is being filled with gravel. Another connection 64 from the discharge line from the pump 54 leads through a flexible connection 66 to the top of the tubing column 32. By means of the valves 68 and 70 in the discharge lines from the pump 54, the volume of fluid entering the tubing 32 and the casing string 24 can be regulated. It is understood that suspension and hoisting mechanism, indicated only by the pulley 26, will be provided above the well head to manipulate the casing liner and tubing strings in the well and to raise the tubing 32 and the casing string 24 simultaneously as the graveling operations proceed.

In the application of the invention, the well cavity 18 is first reamed through the reservoir rock 12 by means of mechanical wall scrapers or under-reamers, or by hydraulic force as shown in my earlier U. S. Letters Patent No. 1,530,221, granted March 17, 1925. The perforated liner or screen 20 is then placed in the well, supported on the packer 22 and extending upwardly through the well cavity and a short distance up into the well casing above. The tubing on which the liner is lowered is disengaged and removed, as previously explained. The special well equipment for controlling the movement of circulating streams of fluid is then inserted in working position in the well and the surface facilities assembled and connected. Gravel is placed in the container 62, and a sufficient quantity of the circulating fluid to be used is placed in the storage tank 48. This fluid may be crude petroleum from the well, water or clay-laden water. For purposes of the present description, it is assumed that crude petroleum will be the fluid used. Casing string 24 and the tubing string 32 are lowered until the foot-piece 28 and packer assembly 34 are near the bottom of the well cavity, the packer being slightly below the level of gravel discharge, as indicated in Figure 1.

The pump 54 is started, drawing oil from the tank 48, forcing it through the head 50 and down through the annular space between strings 24 and 32, and 24 and the liner 20, and thence through the ports 30 into the well cavity 18. Circulation is continued until the well is filled with oil and overflows at the surface from the annular space between the pipe string 24 and the casing 14, through the outlet 46 and into the tank 48. During this time, valve 70 will be open and valves 60 and 68 closed. The valve 68 is then opened, admitting oil under pump pressure to the top of the tubing column 32, causing oil to flow down through that column out through the ports 38 between the packers 34 and into the well cavity through those perforations in the liner 20 between the packers 34. With both streams of circulating fluid thus established, the valve 60 controlling the flow of gravel into the descending stream of oil in casing string 24 is opened slightly so that the gravel particles will flow down the annular space between tubing string 32 and the casing string 24 to be discharged into the well cavity 18 through the ports 30 in the foot-piece 28.

The flow velocities of the two streams of ascending fluid in the well cavity are so regulated by the pump pressure and control valves that the gravel particles may settle slowly in the well cavity below the foot-piece and accumulate on bottom. In doing so, they must settle downward through the ascending stream of washing fluid ejected into the well cavity through liner perforations below the ports in foot-piece 28 through which the gravel particles enter the well cavity. The descending gravel particles are thus washed free of adherent clay and occluded detrital material, these impurities being swept upward toward the surface by the ascending fluids. The two streams of fluid merge in the well cavity at the level of the discharge ports in foot-piece 28 and rise as one stream through the annular space between casings 14 and 24, discharging with the entrained detrital material into storage tank 48.

Slowly, as gravel is deposited in the well cavity, casing 24 and tubing 32 are simultaneously raised, maintaining their relative positions unchanged. Flow continues, depositing washed gravel in the well cavity until it is filled and tubes 24 and 32 have been withdrawn up into the casing above. Circulation is then stopped, surface connections are broken, and tubes 32 and 24 are withdrawn from the well in the order named. As the upper packer 34 near the lower end of column 32 emerges from the upper end of liner 20, it engages loose disc 40 which thus is removed with the tubing to the surface, leaving the upper end of the linear 20 open to receive the production tubing when the well is later equipped for production.

After the casing column 24 has been removed from the well, a short joint of casing, not shown, preferably of the same size as the liner 20 and carrying a wall packer of any suitable type, is lowered and the upper end of the liner 20 then embedded in the gravel envelope is engaged. The packer is then set against the inner wall of the well casing 14, thus closing the annular space between the liner 20 and the casing 14 and permanently confining the gravel within the well cavity 18 and the extreme lower end of the well casing 14. After the packer has been set, the tubing used to lower the short casing section is disengaged and withdrawn to the surface. The same purpose may also be served, but perhaps not quite as effectively, by placing a packer on a string of production tubing at the level of the upper end of the liner 20.

For best results, the volume of the stream of fluid issuing from the perforations in the liner should be carefully controlled so that its upward velocity in the well cavity will permit the gravel particles to settle rapidly in the ascending stream. The larger and heavier the gravel particles and the lower the density of the circulating fluid, the more readily will the gravel settle and the more rapid the ascending velocity of the wash fluid may be. To accentuate the density differential between the gravel particles and the wash fluid as much as possible and thus insure prompt settling of the gravel, the circulating fluid may be an oil of density less than that of water and the "gravel" may consist of carefully sized particles of crushed barite, hematite, siderite, galena or other heavy minerals of density ranging considerably above that of ordinary siliceous rocks of which most gravel particles are composed.

The two streams of fluid entering the well cavity at different depths create three zones of classification for segregation of the suspended fluids. In each of these three zones the ascending fluids will have a different ascending velocity. The volume of fluid entering the cavity through the liner perforations will normally be smaller than that issuing through the ports in the foot-piece so that the ascending velocity below the foot-piece ports will be comparatively low. The gravel particles may settle rapidly through this zone of low ascending velocity fluid, i. e., the "zone of low ascending velocity" or washing and gravel deposition. Here the descending gravel particles are washed free of adherent clay and other low-density contaminants, and gravitational forces deposit the gravel particles in much the same fashion that sedimentation occurs in nature.

After the two streams of fluid merge in the well cavity above the foot-piece ports 30, a much greater ascending velocity is created due to the greater volume of fluid in motion. This is the "zone of higher ascending velocity" or of sorting. The upward velocity here is so great that no detrital material of small size or low density (usually less than that of silica, 2.6) may settle through the ascending fluid. Heavy or relatively coarse gravel particles, however, may settle in this zone. Once the ascending fluids have entered the annular space between casings 14 and 24 above the well cavity, the upward velocity of the fluids is further increased because of the reduced flow cross-section, and all solids in suspension in the fluid, whether detrital material or gravel, are swept rapidly toward the surface. This is the "zone of highest ascending velocity" or of expulsion. Figure 1 shows these zones of differing ascending velocity.

The effect of the ascending stream of fluid in the well cavity may be compared with that of the hydraulic classifier used in ore-dressing operations. For a fluid of given specific gravity and ascending velocity, there is a certain optimum size of solid particle that may be lifted by the ascending stream; or, for solid particles of the same size but variable density, there is a certain minimum density of material that may settle through the ascending stream. Increasing the ascending velocity of the fluid will lift coarser solid particles and particles of higher density, and vice versa. Rittinger, Richards and others have proposed mathematical formulae expressing these relationships.

It is believed that the method of gravel placement herein described accomplishes formation of a gravel envelope filter about a well liner that is superior to one produced by any other process now in use. With condtions in the well cavity properly controlled, a gravel envelope of maximum and uniform density is secured because the gravel particles are settled upon each other through moving fluid, with opportunity for orientation and adjustment of particles in accordance with their size and form. This is nature's process of sedimentation. At the same time, the gravel particles are washed free of clay or other detrital material that would tend locally to reduce the permeability of the gravel envelope. No such material may be deposited with the gravel in the well cavity. The liner perforations are likewise washed free of all detrital material that might later tend to obstruct them. The flow of fluid is first outward toward the wall of the well cavity before it assumes its upward course. Hence, gravel particles in each successive layer are propelled to the perimeter of the well cavity, filling all remote and irregularly shaped recesses—if there be such—before the gravel is deposited about the liner perforations. Upward circulation of fluid along the walls of the well cavity carries all detrital material caving from the walls upward toward the surface so that it may never enter the zone of gravel deposition. If clay-laden water is used as a gravel placement medium, the fluid issuing through the liner perforations may be water free of clay. By this stream of clear water, the settling particles of gravel are washed free of adherent clay and the interstices between the settled gravel particles are left filled with easily displaced water rather than gelled clay which may permanently obstruct future production of oil. Thus, a gravel envelope of maximum permeability for fluids is produced. Use of crushed particles of some heavy mineral rather than ordinary siliceous material, of which stream gravel is ordinarily composed, will give further assurance of a clean, dense and highly permeable filter bed about the well liner.

In the foregoing specifications I have described the preferred arrangement of equipment and method of conducting the gravel packing operation. This, however, is merely by way of example, and it should be understood that other arrangements of equipment and other methods of conducting the operation are possible without departing from the fundamental concepts embodied in the following claims. Different circulating fluids may be used: oil, water, or a suspension of clay in water, for example; and one fluid may be used as a gravel carrying medium and another as a washing medium. Where gravel is mentioned, any granular material insoluble in the circulating fluids may be substituted, and the material may be in rounded, pebble form or it may consist of angular fragments formed by crushing coarser sizes of various rocks or minerals. While a material of high density, i. e., having a specific gravity greater than 3, is ordinarily preferred for this purpose, one of lower density may be equally successful under some circumstances. Various arrangements of tubing heads, packers, etc. are possible, and for some conditions some other arrangement than that described herein may be preferable.

I claim:

1. A method of placing granular material in a well cavity which comprises circulating a quartity of the granular material in a carrier fluid downwardly through a string of tubing and outwardly in a lateral direction into the cavity, simultaneously circulating a stream of liquid downwardly to the cavity through a second string of tubing, ejecting said liquid laterally into the cavity at a point below the entrance of the granular material and carrier fluid, so that the liquid will pick up detrital and foreign material and carry it upwardly to the surface with said carrier fluid through another string of tubing, the granular material settling into the cavity through said liquid, and maintaining the levels of ejection of the granular material and said liquid into the cavity slightly above the level of the deposited granular material while the cavity is being filled with the granular material.

2. A method of placing granular material in a well cavity which comprises circulating a quantity of the granular material in a carrier fluid into the cavity through a string of tubing so that the granular material will settle in the cavity, simultaneously circulating a stream of liquid downwardly to the cavity through a second string of tubing, ejecting said liquid into the cavity at a point slightly below the entrance of the granular material and carrier fluid and directly above the top of the deposited granular material, so that the liquid will pick up detrital and foreign material and carry it upwardly to the surface with said carrier fluid through another string of tubing, and gradually raising said first and second string of tubing as the deposit of granular material is built up in the cavity.

3. A method of placing granular material in a well cavity which comprises circulating a quantity of the granular material in a carrier fluid into the cavity through a string of tubing, simultaneously circulating a stream of liquid downwardly to the cavity through a second string of tubing, ejecting said liquid into the cavity at a point just below the entrance of the granular material and carrier fluid, to create a zone of washing and gravel deposition from which detrital and foreign matter is carried upwardly through a sorting zone of higher ascending velocity within the cavity and then to the surface through an expulsion zone of still higher ascending velocity above the cavity, and maintaining the levels of ejection of the granular material and said liquid into the cavity slightly above the level of the deposited granual material while the cavity is being filled with the granular material.

4. In an apparatus for placing gravel in the producing zone of a well, a perforated liner extending vertically through said zone, a string of tubing extending downwardly through the well, the lower end of said tubing surrounding and having sliding engagement with the outer surface of said liner and provided at its lower end with at least one lateral discharge opening, a second string of tubing extending downwardly from the surface, the lower portion of said second tubing string extending within said liner and provided with a lateral opening adapted to discharge outwardly through the liner perforations at a point below the discharge opening of the first-mentioned tubing string, means for forcing a mixture of granular material and a carrier fluid downwardly through said first tubing string and means for forcing a stream of liquid downwardly through said second tubing string.

5. In an apparatus for graveling a well provided with a casing and an enlarged cavity in a producing formation, a perforated liner extending vertically through said cavity, a string of tubing extending downwardly within said casing with the lower end of the tubing surrounding and having sliding engagement with the outer surface of said liner and provided at its lower end with a least one lateral discharge opening, a second string of tubing extending downwardly from the surface with the lower end of said second tubing string extending within said liner and having sliding engagement with the inner surface of the liner and provided with a lateral opening adapted to discharge outwardly through the liner perforations at a point below the discharge opening of the first-mentioned tubing string, means for forcing a mixture of granular material and a carrier fluid downwardly through said first tubing string and means for forcing a stream of washing liquid downwardly through said second tubing string, the arrangement being such that the washing liquid will pass outwardly and upwardly through the descending granular material so as to pick up the lighter, foreign matter from the granular material and carry it upwardly to the surface through the space between the casing and the first-mentioned string of tubing.

6. In an apparatus for graveling a well provided with an enlarged cavity in a producing formation, a perforated liner extending vertically through said cavity, a string of tubing extending downwardly through the well, a foot-piece on the lower end of said tubing surrounding and having sliding engagement with the outer surface of said liner and provided with a plurality of radial discharge openings, a second string of tubing closed at its bottom end and extending downwardly from the surface within said first tubing string, a pair of packers disposed in separated relation on the lower portion of said second tubing string, said packers having sliding engagement with the inner surface of said liner, said second tubing string being provided with an opening between said packers adapted to discharge outwardly through the liner perforations at a point below the discharge openings of said foot-piece, means for forcing a mixture of granular material and a carrier fluid downwardly through said first tubing string and outwardly into said cavity through the openings in said footpiece, and means for forcing a stream of washing liquid downwardly through said second tubing string and outwardly through the opening between the packers and through the liner perforations into the cavity.

7. In an apparatus for placing gravel in a well provided with an enlarged cavity in a producing formation, a perforated liner extending vertically through said cavity, a string of tubing extending downwardly through the well with the lower end of the tubing surrounding and having sliding engagement with the outer surface of said liner and provided at its lower end with at least one discharge opening, a second string of tubing extending downwardly through the well within said first tubing string, the lower portion of said second tubing string extending within said liner and provided with an opening adapted to discharge outwardly through the liner perforations at a point below the discharge opening of the first-mentioned tubing string, an annular cover member slidably disposed around said second tubing string and adapted to engage and cover the upper end of said liner when the lower portion of the second tubing string is within the liner, means for forcing a mixture of granular material and a carrier fluid downwardly through said first tubing string and means for forcing a stream of washing liquid downwardly through said second tubing string.

LESTER CHARLES UREN.